United States Patent
Yamada et al.

(10) Patent No.: US 9,487,061 B2
(45) Date of Patent: Nov. 8, 2016

(54) METHOD FOR PREVENTING WATER INTRUSION IN VEHICLE SYSTEMS

(71) Applicant: NISSAN NORTH AMERICA, INC., Franklin, TN (US)

(72) Inventors: Yukiyo Yamada, Commerce, MI (US); Kazuaki Shimizu, Novi, MI (US); Kazuhiko Hanaya, West Bloomfield, MI (US); Daisuke Watanabe, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 773 days.

(21) Appl. No.: 13/736,115

(22) Filed: Jan. 8, 2013

(65) Prior Publication Data

US 2014/0194046 A1    Jul. 10, 2014

(51) Int. Cl.
*B60P 3/06* (2006.01)
*B60H 1/00* (2006.01)
*F02M 25/08* (2006.01)
*F02M 35/08* (2006.01)
*B60P 3/10* (2006.01)

(52) U.S. Cl.
CPC ........ *B60H 1/00821* (2013.01); *F02M 25/089* (2013.01); *F02M 35/088* (2013.01); *B60P 3/10* (2013.01); *Y10S 280/14* (2013.01)

(58) Field of Classification Search
CPC ..... B60P 3/10; Y10S 280/14; F02M 25/089; F02M 35/088
See application file for complete search history.

(56) References Cited

U.S. PATENT DOCUMENTS

| 5,097,250 A | * | 3/1992 | Hernandez | B62D 15/02 180/271 |
| 5,564,466 A | | 10/1996 | Aoyama et al. | |
| 2004/0036601 A1 | * | 2/2004 | Obradovich | G08G 1/167 340/540 |

FOREIGN PATENT DOCUMENTS

| JP | 1999173229 A | 6/1999 |
| JP | 2001180309 A | 7/2001 |
| JP | 2005104394 A | 4/2005 |
| JP | 2006316692 A | 11/2006 |

* cited by examiner

*Primary Examiner* — Hai Huynh
*Assistant Examiner* — Gonzalo Laguarda
(74) *Attorney, Agent, or Firm* — Young Basile Hanlon & MacFarlane, P.C.

(57) ABSTRACT

A method for controlling a vehicle system includes receiving, at a control system, a request to open an ambient air inlet valve of a vehicle component, wherein the ambient air inlet valve is operable to move from a closed position to an open position in response to an open signal that is transmitted to the ambient air inlet valve from the control system. The method also includes determining whether a towing condition is present, determining whether at least one submergence risk criterion is present, and transmitting the open signal to the ambient air inlet valve, in response to the request to open the ambient air inlet valve, if the towing condition is not present or the at least one submergence risk criterion is not present.

2 Claims, 4 Drawing Sheets

METHOD FOR PREVENTING WATER INTRUSION IN VEHICLE SYSTEMS

TECHNICAL FIELD

The disclosure herein relates in general to the field of preventing water intrusion in vehicle systems.

BACKGROUND

In some vehicle systems, ambient air is admitted into the system at a valve. If the valve is submerged when the valve is opened, water can enter the vehicle system. In many vehicle systems, water intrusion can cause damage either immediately, or over a course of time.

One example of a vehicle system that admits ambient air using a valve is an evaporative emissions control system that can be incorporated in vehicles having an internal combustion engine. The evaporative emissions control system of a vehicle is designed to prevent the release of fuel vapors into the atmosphere from the fuel storage and fuel delivery systems of the vehicle. In these systems, fuel vapors can be vented to a canister that contains an adsorbent material. One example of an adsorbent material that is used for this purpose is activated carbon.

During operation of the evaporative emissions system, fuel vapors that enter the canister are adsorbed by the activated carbon. Periodically, the fuel vapors are purged from the canister, and delivered to the engine where they are burned. In order to purge the fuel vapors from the canister, the fuel vapors are pumped under pressure from the canister to the engine. Because the evaporative emissions system is otherwise sealed, ambient air must be admitted to allow the fuel vapors to be purged from the adsorbent material and pumped to the engine. Thus, an ambient air inlet valve is opened to allow admission of ambient air when the fuel vapors are purged.

In some systems, ambient air intake components are protected by a shroud or cover. While these types of structures are effective in preventing intrusion of splashing water, they are not effective in preventing water intrusion when the ambient air intake components are submerged. In some systems, ambient air intake components are located in areas of the vehicle where they are less likely to become submerged. Doing so, however, is not always feasible.

SUMMARY

Disclosed herein are methods and apparatuses for preventing water intrusion in vehicle systems.

One aspect of the disclosed embodiments is a method for controlling a vehicle system. The method includes receiving, at a control system, a request to open an ambient air inlet valve of a vehicle component. The ambient air inlet valve is operable to move from a closed position to an open position in response to an open signal that is transmitted to the ambient air inlet valve from the control system. The method also includes determining whether a towing condition is present, determining whether at least one submergence risk criterion is present, and transmitting the open signal to the ambient air inlet valve, in response to the request to open the ambient air inlet valve, if the towing condition is not present or the at least one submergence risk criterion is not present.

Another aspect of the disclosed embodiments is an apparatus that includes a vehicle component having an ambient air inlet valve is operable to move from a closed position to an open position in response to an open signal and a control system. The control system is operable to receive a request to open the ambient air inlet valve, determine whether a towing condition is present, determine whether at least one submergence risk criterion is present, and transmit the open signal to the ambient air inlet valve, in response to the request to open the ambient air inlet valve, if the towing condition is not present or the at least one submergence risk criterion is not present.

Another aspect of the disclosed embodiments is a method that includes receiving, at a control system, a request to open an ambient air inlet valve of a vehicle component. The ambient air inlet valve is operable to move from a closed position to an open position in response to an open signal that is transmitted to the ambient air inlet valve from the control system. The method also includes monitoring at least one vehicle operating characteristic that is related to a submergence risk, and determining whether to transmit the open signal from the control system to the ambient air inlet valve based on the at least one vehicle operating characteristic.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are methods for preventing water intrusion in vehicle systems. The methods disclosed herein can be utilized with vehicle systems that control intake of ambient air, by controlling the system such that operations requiring intake of ambient air are not performed when there is a risk that water will be introduced into the vehicle system.

An evaporative emissions control system is one example of a vehicle system that can be controlled to prevent water intrusion. The evaporative emissions control system of a vehicle can perform various operations that include introducing ambient air into the system using a valve. Examples of these operations include a fuel vapor purge operation and a diagnostic operation. However, the systems and methods described herein are not necessarily limited to use with evaporative emissions systems or any specific type of operation.

The systems and methods disclosed herein can monitor one or more vehicle operating characteristics that are related to a submergence risk. As used herein, the term "submergence risk" refers to a condition or set of conditions that are associated with an elevated risk that an ambient air intake valve of a vehicle system will become submerged in water. A determination as to whether to open the ambient air intake valve can be made based on the one or more vehicle operating characteristics that are related to the submergence risk.

Figure 1:
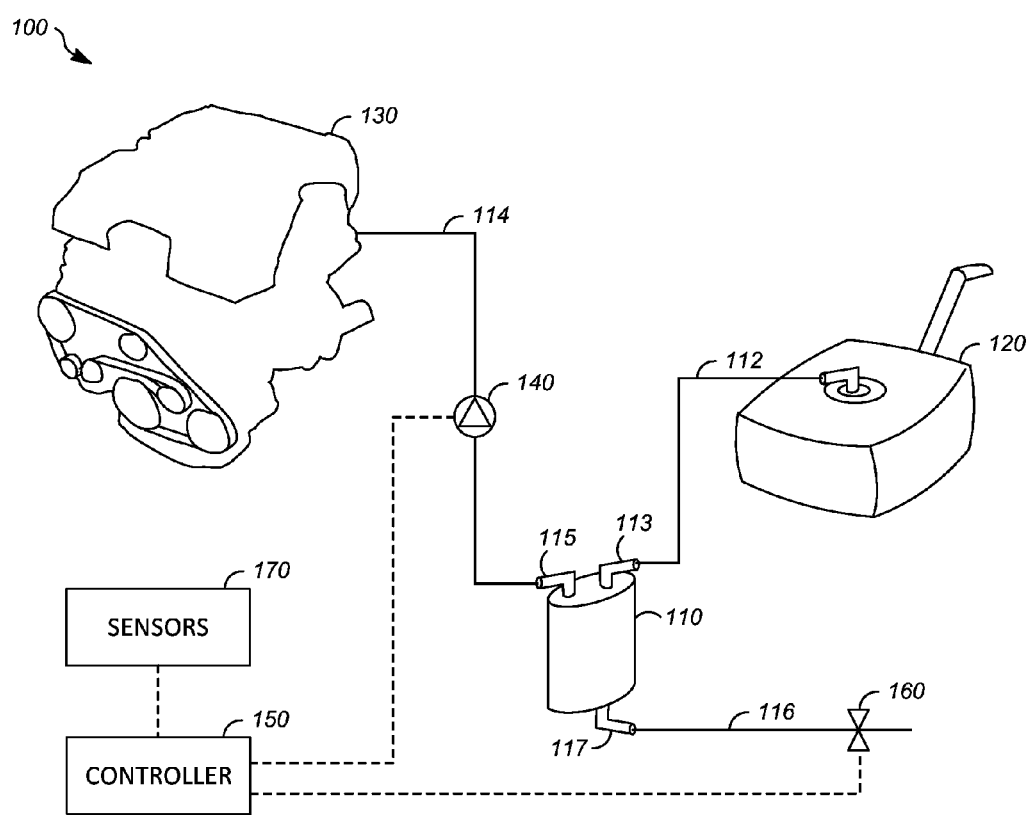
FIG. 1 is an illustration showing components of an evaporative emissions control system of a vehicle.

FIG. 1 is an illustration showing components of an evaporative emissions control system 100 of a vehicle (not shown in FIG. 1). The evaporative emissions control system 100 can include additional components that are not illustrated. The evaporative emissions control system 100 is shown as an example of a system with respect to which methods for preventing water intrusion can be applied. The methods discussed herein can be applied to systems other than the evaporative emissions control system 100.

The evaporative emissions control system 100 can include a canister 110 that receives fuel vapor from a fuel tank 120. The fuel tank 120 can be utilized to contain liquid fuel of any desired type for delivery to an internal combustion engine 130.

The canister 110 is adapted to receive fuel vapors from the fuel tank 120. The canister 110 can contain an adsorbent material, such as activated carbon, for the purpose of adsorbing the fuel vapors that are received by the canister 110. The fuel vapors can be delivered to the canister 110 from the fuel tank 130 via a first conduit 112 that is connected to the fuel tank 130 and is connected to a fuel vapor inlet 113 of the canister 110. Additional components may or may not be disposed along the first conduit 112 between the canister 110 and the fuel tank 120.

The canister 110 can be connected to the internal combustion engine 130 for the purpose of delivering the fuel vapor from the canister 110 to the internal combustion engine where it can be combusted. The fuel vapor can be delivered to the internal combustion engine 130 via a second conduit 114 that is connected to the canister 110 at a fuel vapor outlet 115 and is connected to the internal combustion engine 130. Addition components may or may not be positioned along the second conduit 114 between the canister 110 and the internal combustion engine 130.

One example of a component that can be positioned along the second conduit 114 is a pump 140. The pump 140 can be utilized to pump the fuel vapor from the canister 110 to the internal combustion engine 130 by inducing negative pressure at the fuel vapor outlet 115 of the canister 110. The pump 140 can be engaged and disengaged in order to perform one or more operations that are associated with the evaporative emissions control system 100, as will be discussed further herein. As an example, the pump 140 can be an electrically-operated pump that is engaged and disengaged by signals that are received from a control system such as a controller 150.

In one implementation, the controller 150 can be or include one or more processors that are associated with a computer readable storage device, such as a volatile memory device, a non-volatile memory device, a magnetic storage device, an optical storage device, or any other suitable storage device that is operable to store computer program instructions. The instructions, when executed by the controller 150, can cause the controller 150 to perform operations, such as those described in connection with the methods discussed herein.

In order to allow entry of ambient air into the canister 110, a third conduit 116 can connect an ambient air inlet valve 160 to an ambient air inlet 117 of the canister 110. The ambient air inlet valve 160 can be moved between an open position and a closed position.

In one example, the ambient air inlet valve 160 is a pressure-operated valve that opens and closes in response to pressure changes within the canister 110 and/or the third conduit 116. For example, the ambient air inlet valve 160 could be a pressure-operated valve that opens in response to vacuum pressure that is induced in the third conduit 116 by operation of the pump 140 and a corresponding creation of a vacuum condition within the canister 110.

In another example, the ambient air inlet valve 160 can be an electrically-operated valve that is opened and closed in response to signals that are received from a controller 160, such as an "open signal" and a "close signal." For this purpose, the ambient air inlet valve 160 can be electrically connected to the controller 150.

The controller 150 can receive signals and/or data from one or more sensors 170. The sensors 170 can be or include any manner of sensor that is operable to provide signals and/or data regarding vehicle operating characteristics.

At least some of the vehicle operating characteristics that are monitored by the sensors 170 can be related to a submergence risk. As one example, the sensors 170 can monitor operating characteristics of the engine 130, such as engine RPM values and engine torque values. As another example, the sensors 170 can monitor vehicle speed. As another example, the sensors 170 can monitor a current inclination angle of the vehicle. As another example, sensors 170 can monitor the current state of a transmission of the vehicle, such as whether the vehicle is in a reverse driving mode. As another example, the sensors 170 can monitor whether a trailer wiring connection is active, meaning that the wiring harness of the vehicle is connected to the wiring harness of a trailer that is being towed by the vehicle. Other vehicle operating characteristics can be monitored by the sensors 170 and utilized by the methods described herein.

The evaporative emissions control system 100 can perform one or more operations that include admitting ambient air into the interior of the canister 110. These operations can be performed under the direction of the controller 150. For example, the controller 150 can execute one or more programs or functions that cause performance of operations by the evaporative emissions control system 100.

One example of an operation in which ambient air is admitted to the canister 110 is a fuel vapor purge operation. During operation of the evaporative emissions control system 100, fuel vapor collects on the surfaces of the adsorbent material that is contained within the canister 110. The purge operation removes the fuel vapor from the surfaces of the adsorbent material in the canister 110 and delivers the fuel vapor to the internal combustion engine 130, where it is combusted during normal operation of the engine. During the fuel vapor purge operation, pressure is applied at the canister 110 in order to pump the fuel vapor from the canister 110 to the engine 130. As an example, negative pressure can be applied to the interior of the canister 110 by the pump 140. Other configurations could be utilized in which positive pressure is applied to the interior of the canister 110 by locating the pump 140 at a location other than along the second conduit 114, such as along the third conduit 116.

When pressure is applied to the interior of the canister 110, ambient air is admitted into the canister 110 in order to allow the fuel vapor to be released from the surfaces of the adsorbent material that is disposed within the canister 110. This can be accomplished, for example, by opening the ambient air inlet valve 160, either in response to pressure along the third conduit 116 or in response to a signal that is received at the ambient air inlet valve 160 from the controller 150.

Other operations that admit ambient air into the canister 110 can be performed by the evaporative emissions control system 100. Another example of an operation that can admit ambient air into the canister 110 is an onboard diagnostic test of the evaporative emissions control system 100.

The controller 150 can be operable to receive requests to admit ambient air into the canister 110, such as by opening the ambient air inlet valve 160. These requests can be provided by operations such as the fuel vapor purge operation and the onboard diagnostic test operation, as previously discussed. In response to requests to admit ambient air to the canister 110, the controller 150 can monitor one or more operating characteristics of the vehicle that are related to a submergence risk. Based on vehicle operating characteristics, the controller 150 determines whether to admit ambient air into the canister 110, such as by opening the valve 160.

In one example, the controller 150 can determine that a submergence risk is present when a towing condition is present. Whether or not a towing condition is present can be determined based on engine operating characteristics, such as the engine rpm value and the engine torque value. For example, when a towing condition is present, a relationship between the engine RPM value and the engine torque value is known to deviate from a nominal relationship of the engine RPM value to the engine torque value. The determination as to whether the towing condition is present can be made based on a magnitude of this deviation. In one implementation, if the deviation of a relationship between the engine torque value and the engine RPM value with respect to a nominal relationship between the engine torque value and the engine RPM value exceeds a threshold, a controller 150 can determine that the towing condition is present.

In another example, the controller 150 can determine that the towing condition is present based on whether a trailer wiring connection is active. If the controller 150 determines that the controller wiring in connection is active, the controller 150 can determine that the towing condition is considered to be present.

In another example, the controller 150 can determine that a submergence risk criterion is present based on the current vehicle speed. For example, when the current vehicle speed is lower than a threshold speed, the controller 150 can determine that the submergence risk criterion is present.

In another example, the controller 150 can determine whether the submergence risk criterion is present based on the current inclination angle of the vehicle. The current inclination angle of the vehicle can refer to a deviation of the position of the vehicle from a horizontal position, by a difference in elevation of the front wheels of the vehicle with respect to the elevation of the rear wheels of the vehicle. In one example, the controller 150 can determine that a submergence risk criterion is present when the current inclination angle of the vehicle is greater than a threshold inclination value.

In another example, the controller 150 can determine whether a submergence risk criterion is present based on a current mode of the transmission of the vehicle. For example, the controller 150 can determine that the submergence risk criterion is present when the vehicle is in a reverse driving mode.

Figure 2:
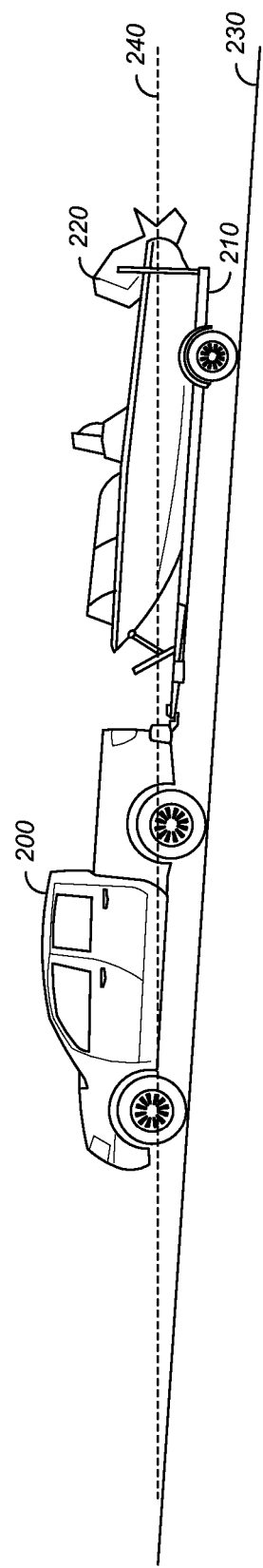
FIG. 2 is an illustration showing a vehicle towing a trailer in a boat launch scenario.

In some implementations, the controller 150 can determine that a submergence risk exists based on the presence of multiple submergence risk criteria. FIG. 2 is an illustration showing a vehicle 200 that is towing a trailer 210 in a boat launch scenario. One method for launching a boat 220 from a trailer 210 that is towed by a vehicle 200 includes driving the vehicle 200 in a reverse driving mode while on an inclined ramp 230 such that the trailer 210 and the boat 220 are lowered into a body of water 240. In this scenario, the submergence risk criteria that are present can include the presence of the towing condition, the vehicle speed being lower than a threshold vehicle speed, the inclination angle of the vehicle being greater than a threshold inclination angle, and operation of the vehicle in a reverse driving mode. The controller 150 can conclude that there is a submergence risk based on the presence of any of these criteria. In particular examples, the controller 150 can determine that there is a submergence risk based on the presence of two or more of these submergence risk criteria. For example, the controller 150 can be operable to determine that there is a submergence risk based on the towing condition in combination with any of the inclination angle of the vehicle, the vehicle speed, or the reverse driving mode of the vehicle.

Figure 3:
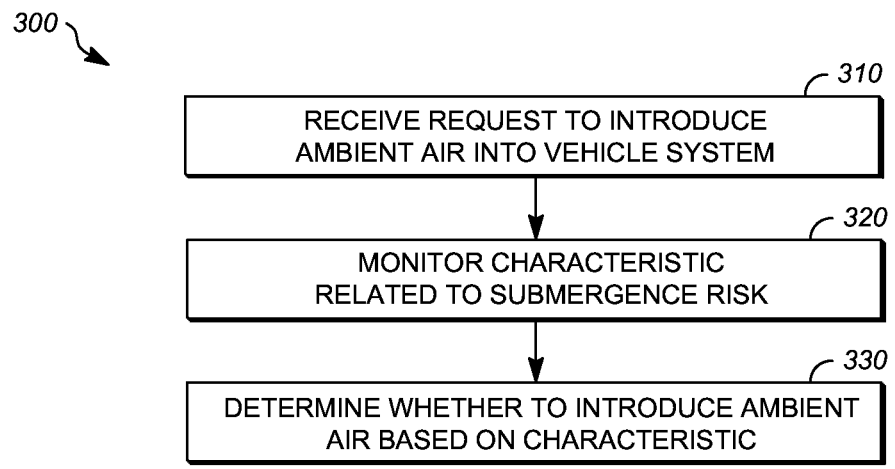
FIG. 3 is a flow chart showing a first example of a process for preventing water intrusion in vehicle systems.

FIG. 3 is a flow chart showing a first example of a process for preventing water intrusion in vehicle systems. The process 300 can be performed, for example, by a processor that executes program instructions that cause the processor to perform the operations described with respect to the process 300. One example of a device that can implement the process 300 is the controller 150, which can access the process 300 in the form of instructions that are stored on a computer-readable storage device.

In operation 310, a request to introduce ambient air into a vehicle system is received. The request can be generated by another vehicle system or function. Receiving the request can be performed, for example, by the controller 150. A request can be received in any manner, such as by receiving in memory, receiving via a transmission of signals and/or data, or receiving from a storage device.

In operation 320, at least one vehicle operating characteristic that is related to a submergence risk is monitored. The vehicle operating characteristic can be monitored, for example, by the controller 150. Any vehicle operating characteristic that is related to a submergence risk can be monitored at operation 320, including the example characteristics that were previously discussed.

In operation 330, a determination is made as to whether to introduce ambient air into the vehicle system based on the vehicle operating characteristic. This determination can be made, for example, by the controller 150, and can include determining whether at least one submergence risk criterion is present.

In response to the determination as to whether to introduce ambient air into the vehicle system at operation 330, the controller 150 can cause introduction of ambient air into the vehicle system, for example, by transmitting an open signal to the ambient air inlet valve 160 or by activating the pump 140 if it is determined that ambient air should be introduced into the vehicle system. If it is determined that ambient air should not be introduced into the vehicle system, the controller 150 can suppress introduction of ambient air into the vehicle system, for example, by suppressing transmission of the open signal to the valve 160 or by suppressing operation of the pump 140.

Figure 4:
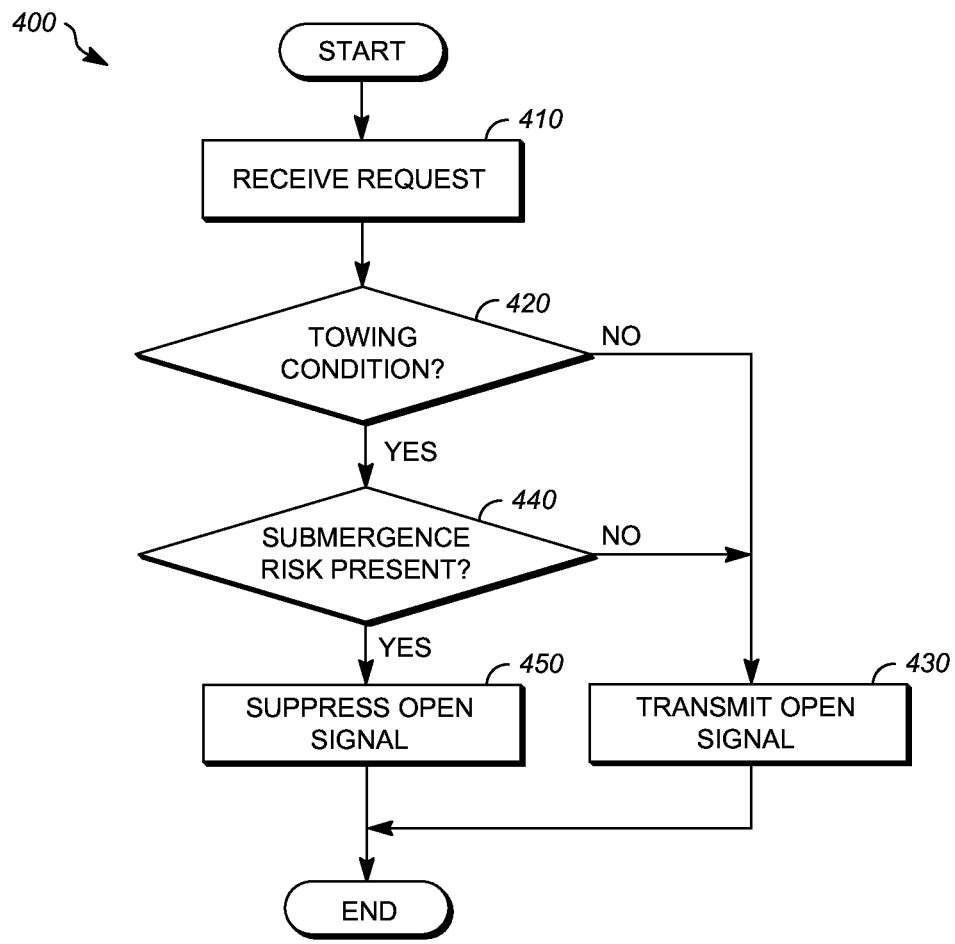
FIG. 4 is a flow chart showing a second example of a process for preventing water intrusion in vehicle systems.

FIG. 4 is a flow chart showing a second example of a process 400 for preventing water intrusion in vehicle systems.

At operation 410, a request is received to open the ambient air inlet valve 160. At operation 420, a determination is made as to whether the towing condition is present. If the towing condition is not present, the process proceeds to operation 430, where the open signal is transmitted from the controller 150 to the valve 160. The process then ends.

If, at operation 420, it is determined that the towing condition is not present, the process proceeds to operation 440. At operation 440, a determination is made as to whether a submergence risk is present. If it is determined that a submergence risk is not present, the process proceeds to operation 430, where the open signal is transmitted to the valve 160, and the process then ends. If, at operation 440, it is determined that the submergence risk is present, the process proceeds to operation 450, where transmission of the open signal is suppressed. The process then ends.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for preventing water intrusion into an ambient air intake valve of a vehicle, comprising: receiving, at a control system, a request to open the ambient air inlet valve of an evaporative emissions system, wherein the ambient air inlet valve is operable to move from a closed position to an open position in response to an open signal requesting air intake that is transmitted to the ambient air inlet valve from the control system; when there is indication that the vehicle is towing a trailer with a trailer wiring sensor or by comparing at least one engine operating parameter to a threshold value, determining whether a submergence risk criteria is present, the submergence risk criteria comprising one or more of: sensing with a speed sensor a vehicle speed lower than a threshold vehicle speed; sensing with an inclination sensor an inclination angle of the vehicle greater than a threshold inclination; determining that the vehicle is in a reverse driving mode with a transmission sensor; transmitting the open signal to the ambient air inlet valve, in response to the request to open the ambient air inlet valve, if one or more of the submergence risk criteria is not present; and blocking the open signal to the ambient air inlet valve, in response to the request to open the ambient air inlet valve, if one or more of the submergence risk criteria are present.

2. An apparatus for preventing water intrusion into an ambient air intake valve of a vehicle, comprising: an evaporative emissions system having the ambient air inlet valve operable to move from a closed position to an open position in response to an open signal requesting intake of air and a closed signal; and a control system that is operable to: receive a request from the evaporative emissions system to open the ambient air inlet valve, when there is indication that the vehicle is towing a trailer with a trailer wiring sensor or by comparing at least one engine operating parameter to a threshold value, determine whether a submergence risk criteria is present, the submergence risk criteria comprising one or more of: vehicle speed below a threshold speed with a speed sensor; an inclination angle of the vehicle greater than a threshold inclination with an inclination sensor; and driving in a reverse driving mode with a transmission sensor; transmit the open signal to the ambient air inlet valve, in response to the request to open the ambient air inlet valve, if one or more of the submergence risk criteria is not present; and block the open signal to the ambient air inlet valve, in response to the request to open the ambient air net valve, if one or more of the submergence risk criteria are present.

* * * * *